(12) United States Patent
Nishio et al.

(10) Patent No.: US 11,943,757 B2
(45) Date of Patent: *Mar. 26, 2024

(54) COMMUNICATION DEVICE AND COMMUNICATION METHOD

(71) Applicant: Panasonic Holdings Corporation, Osaka (JP)

(72) Inventors: Akihiko Nishio, Osaka (JP); Christian Wengerter, Kleinheubach (DE); Hidetoshi Suzuki, Kanagawa (JP); Katsuhiko Hiramatsu, Osaka (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,978

(22) Filed: Dec. 15, 2022

(65) Prior Publication Data

US 2023/0121741 A1  Apr. 20, 2023

Related U.S. Application Data

(63) Continuation of application No. 17/571,317, filed on Jan. 7, 2022, now Pat. No. 11,564,225, which is a
(Continued)

(30) Foreign Application Priority Data

Jan. 4, 2008 (JP) .................. 2008-000198
Mar. 12, 2008 (JP) .................. 2008-062970

(51) Int. Cl.
*H04W 72/04* (2023.01)
*H04L 5/00* (2006.01)
(Continued)

(52) U.S. Cl.
CPC ....... *H04W 72/0453* (2013.01); *H04L 5/0007* (2013.01); *H04L 5/001* (2013.01);
(Continued)

(58) Field of Classification Search
CPC .......... H04W 72/0453; H04W 72/042; H04W 72/00; H04W 72/044; H04W 72/04;
(Continued)

(56) References Cited

U.S. PATENT DOCUMENTS 5,422,913 A   6/1995  Wilkinson
7,639,660 B2  12/2009 Kim et al.
(Continued)

FOREIGN PATENT DOCUMENTS

WO  WO 2007094628 A1  8/2007
WO  WO 2008020623 A1  2/2008

OTHER PUBLICATIONS

3GPP TS 36.213 V8.1.0, "3rd Generation Partnership Project; Technical Specification Group Radio Access Network; Evolved Universal Terrestrial Radio Access (E-UTRA); Physical layer procedures (Release 8)," Nov. 2007. (2 pages).
(Continued)

*Primary Examiner* — Mounir Moutaouakil
(74) *Attorney, Agent, or Firm* — Seed IP Law Group LLP

(57) ABSTRACT

In a wireless communication base station device, a modulation unit carries out modulation processing for Dch data after coding to generate a Dch data symbol. A modulation unit carries out modulation processing for Lch data after coding to generate an Lch data symbol. An allocation unit allocates the Dch data symbol and Lch data symbol to each sub-carrier composing an OFDM symbol and outputs the allocated sub-carrier to a multiplex unit. In this case, the allocation unit allocates the Dch data symbol to a plurality of resource blocks where one Dch is arranged at an interval
(Continued)

equal to integral multiples of the number of resource blocks composing a resource block group.

20 Claims, 14 Drawing Sheets

Related U.S. Application Data continuation of application No. 17/034,955, filed on Sep. 28, 2020, now Pat. No. 11,252,729, which is a continuation of application No. 16/675,547, filed on Nov. 6, 2019, now Pat. No. 10,827,494, which is a continuation of application No. 16/384,495, filed on Apr. 15, 2019, now Pat. No. 10,506,599, which is a continuation of application No. 16/204,248, filed on Nov. 29, 2018, now Pat. No. 10,306,644, which is a continuation of application No. 16/109,317, filed on Aug. 22, 2018, now Pat. No. 10,178,675, which is a continuation of application No. 15/942,075, filed on Mar. 30, 2018, now Pat. No. 10,085,264, which is a continuation of application No. 15/703,669, filed on Sep. 13, 2017, now Pat. No. 9,999,056, which is a continuation of application No. 15/474,965, filed on Mar. 30, 2017, now Pat. No. 9,794,941, which is a continuation of application No. 15/357,763, filed on Nov. 21, 2016, now Pat. No. 9,642,143, which is a continuation of application No. 15/206,055, filed on Jul. 8, 2016, now Pat. No. 9,544,899, which is a continuation of application No. 15/009,459, filed on Jan. 28, 2016, now Pat. No. 9,420,581, which is a continuation of application No. 13/759,731, filed on Feb. 5, 2013, now Pat. No. 9,288,788, which is a continuation of application No. 13/468,833, filed on May 10, 2012, now Pat. No. 8,416,807, which is a continuation of application No. 13/104,336, filed on May 10, 2011, now Pat. No. 8,208,491, which is a continuation of application No. 12/983,713, filed on Jan. 3, 2011, now Pat. No. 8,160,100, which is a continuation of application No. 12/671,198, filed as application No. PCT/JP2008/004010 on Dec. 26, 2008, now Pat. No. 7,991,004.

(51) Int. Cl.
  *H04W 72/00* (2023.01)
  *H04W 72/044* (2023.01)
  *H04W 72/0453* (2023.01)
  *H04W 72/23* (2023.01)

(52) U.S. Cl.
  CPC .......... *H04L 5/0042* (2013.01); *H04L 5/0053* (2013.01); *H04W 72/00* (2013.01); *H04W 72/04* (2013.01); *H04W 72/044* (2013.01); *H04W 72/23* (2023.01)

(58) Field of Classification Search
  CPC ..... H04L 5/0053; H04L 5/0007; H04L 5/001; H04L 5/0042
  USPC ....... 370/203, 208, 209, 468, 328, 329, 465, 370/343, 344, 437; 375/240.02, 246, 316, 375/324, 340
  See application file for complete search history.

(56) References Cited

U.S. PATENT DOCUMENTS

| | | | |
|---|---|---|---|
| 7,688,708 | B2 | 3/2010 | Li et al. |
| 7,706,249 | B2 | 4/2010 | Akita et al. |
| 7,782,896 | B2 | 8/2010 | Kuri et al. |
| 7,885,230 | B2 | 2/2011 | Seo et al. |
| 8,218,420 | B2 | 7/2012 | Chong et al. |
| 8,301,155 | B2 | 10/2012 | Ho et al. |
| 8,477,701 | B2 | 7/2013 | Nam et al. |
| 8,634,388 | B2 | 1/2014 | Seo et al. |
| 9,185,701 | B2 | 11/2015 | Seo et al. |
| 9,265,033 | B2 | 2/2016 | Seo et al. |
| 2002/0164954 | A1 | 11/2002 | Jalali |
| 2003/0026293 | A1 | 2/2003 | Raissinia et al. |
| 2003/0035393 | A1 | 2/2003 | Sinnarajah et al. |
| 2004/0082356 | A1 | 4/2004 | Walton et al. |
| 2006/0009168 | A1 | 1/2006 | Khan et al. |
| 2006/0205414 | A1 | 9/2006 | Teague |
| 2008/0101319 | A1 | 5/2008 | Rao |
| 2008/0232240 | A1 | 9/2008 | Baum et al. |
| 2009/0303944 | A1 | 12/2009 | Fukuoka et al. |
| 2010/0226318 | A1 | 9/2010 | Nishio et al. |

OTHER PUBLICATIONS

Alcatel-Lucent, "Distributed Virtual Resource Block Mapping for Persistent Resource Allocation as VoIP," R1-07-4981, Agenda Item: 6.2.5, 3GPP TSG RAN WG1 #51 Meeting, Jeju, Korea, Nov. 5-9, 2007. (5 pages).
Extended European Search Report, dated Jan. 19, 2012, for European Patent Application No. 08869337.9. (6 pages).
International Search Report, dated Feb. 3, 2009, for International Patent Application No. PCT/JP2008/004010. (2 pages).
LG Electronics, "DL LVRB assignment," R1-072877, Agenda Item: 5.13.1, 3GPP TSG RAN WG1 #49bis, Orlando, USA, Jun. 25-29, 2007. (4 pages).
Mitsubishi Electric, "Further Study of Resource Allocation in Downlink," Tdoc R1-074552, Agenda Item: 6.2.3, 3GPP TSG RAN WG1 #51, Jeju-do, Korea, Nov. 5-9, 2007. (8 pages).
Motorola, "Downlink Resource Allocation Mapping for E-UTRA," R1-073372, Agenda Item: 7.2.3, 3GPP TSG RAN1 #50, Athens, Greece, Aug. 20-29, 2007. (5 pages).
NEC Group, "DL Distributed Resource Signaling for EUTRA," R1-074722, Agenda Item: 6.2.5, TSG-RAN WG1#51, Jeju, South Korea, Nov. 5 -9, 2007. (2 pages).
NEC Group, "Unified approach for transmission of DL control channels," R1-070880, Agenda item: 6.9.2, RAN WG1 meeting 48, St. Louis, Missouri, USA, Feb. 12-16, 2007. (10 pages).
NTT DoCoMo et al., "Comparison Between RB-level and Sub-carrier-level Distributed Transmission for Shared Data Channel in E-UTRA Downlink," R1-072431, Agenda Item: 7.12, 3GPP TSG RAN WG1 Meeting #49, Kobe, Japan, May 7-11, 2007. (13 pages).
NTT DoCoMo et al., "RB-level Distributed Transmission Method for Shared Data Channel in E-UTRA Downlink," R1-073687, Agenda Item: 7.2.5, 3GPP TSG RAN WG1 Meeting #50, Athens, Greece, Aug. 20-24, 2007. (6 pages).
Office Action, dated Dec. 25, 2012, for Russian Patent Application No. 2010127271/07(038828). (8 pages) (with English Translation).
Panasonic, "DVRB-pair to PRB-pair assignment and signaling," R1-074920, Agenda Item: 6.2.5, 3GPP TSG-RAN WG1 Meeting #51, Jeju, Korea, Nov. 5-9, 2007. (3 pages).
Extended European Search Report, dated May 17, 2023, for European Patent Application No. 23154482.6. (7 pages).
Motorola, "E-UTRA DL Distributed Multiplexing and Mapping Rules: Performance," R1-073392, Agenda Item: 7.2.5, 3GPP TSG RAN1#50, Athens, Greece, Aug. 20-24, 2007. (7 pages).
Motorola, "A simple example of dynamic DVRB signaling," R1-074018, Agenda Item: 6.2.5, 3GPP TSG RAN1#50bis, Shanghai, China, Oct. 8-12, 2007. (2 pages).

F.I.G. 4

COMMUNICATION DEVICE AND COMMUNICATION METHOD

BACKGROUND

Technical Field

The present disclosure relates to a channel mapping method and a radio communication base station apparatus in multicarrier communication.

Description of the Related Art

In recent years, various types of information such as images and data, in addition to voice, are transmitted in radio communication, and in mobile communication, in particular. In the future, demands for still higher-speed transmission are expected to further increase, and carrying out high-speed transmission requires a radio transmission technique to use limited frequency resources more efficiently and realize higher-speed transmission efficiency.

One of radio transmission techniques capable of meeting such demands is OFDM (Orthogonal Frequency Division Multiplexing). OFDM is a multicarrier transmission technique for transmitting data in parallel using many subcarriers, has features such as high frequency efficiency, reduction of interference between symbols in a multipath environment and is known to be effective in improving transmission efficiency.

Discussions are underway to carry out frequency scheduling transmission and frequency diversity transmission when frequency-domain-multiplexing data to a plurality of radio communication mobile station apparatuses (hereinafter simply referred to as "mobile stations") with a plurality of subcarriers using this OFDM on a downlink.

In frequency scheduling transmission, a radio communication base station apparatus (hereinafter simply referred to as "base station") adaptively allocates subcarriers to each mobile station based on received quality per frequency band at each mobile station, and thereby obtain multiuser diversity effect and carry out communication very efficiently. Such frequency scheduling transmission is a scheme suitable for mainly data communication or high-speed data communication when a mobile station is moving at a low speed. On the other hand, since frequency scheduling transmission employs feedback of received quality information from each mobile station, frequency scheduling transmission is unsuitable for data communication when the mobile station is moving at a high speed. Furthermore, frequency scheduling is normally performed per resource block (RB) formed into a block by grouping several neighboring subcarriers into a transmission time unit called "subframe." The channel for carrying out such frequency scheduling transmission is called "localized channel" (hereinafter referred to as "Lch").

By contrast, in the frequency diversity transmission, data for each mobile station is distributed across and allocated to subcarriers in the entire band, and high frequency diversity effect can therefore be obtained. Furthermore, frequency diversity transmission does not require received quality information from the mobile station, and therefore this is an effective scheme in the situation as described above in which it is difficult to apply frequency scheduling transmission. On the other hand, since frequency diversity transmission is carried out irrespective of the received quality at each mobile station, no multiuser diversity effect as in the case of frequency scheduling transmission is obtained. The channel for carrying out such frequency diversity transmission is called "Distributed Channel (hereinafter referred to as "Dch").

Furthermore, frequency scheduling transmission through Lch and frequency diversity transmission through Dch may be carried out at the same time. That is, RBs used for Lch and RBs used for Dch on a plurality of subcarriers of one OFDM symbol may be frequency-domain-multiplexed. In this case, each RB and Lch are associated with each other and each RB and Dch are associated with each other in advance, and it is controlled in subframe units which RB should be used as Lch or Dch.

Furthermore, studies are being conducted to divide RBs to use for Dch into a plurality of subblocks and configure one Dch by a combination of different RB subblocks (e.g., see Non-Patent Document 1). To be more specific, when an RB is divided into two subblocks, one Dch is mapped to two divided subblocks.

Non-Patent Document 1: R1-072431 "Comparison between RB-level and Sub-carrier-level Distributed Transmission for Shared Data Channel in E-UTRA Downlink" 3GPP TSG RAN WG1 LTE Meeting, Kobe, Japan, 7-11 May 2007.

BRIEF SUMMARY

According to the above described prior art, the interval between RB s to which one Dch is mapped (hereinafter referred to as "RB interval") is determined in advance. For example, one Dch is mapped to two RB subblocks where the RB interval is "floor" (the number of all RBs/2). Here, the operator floor(x) denotes a maximum integer not exceeding x. Thus, only the channel number of Dch may be indicated from the base station to the mobile station, and therefore the amount of control information can be suppressed to a small value. Furthermore, Dchs can be mapped to RBs at equal intervals. Thus, since the RB interval of RB in which one Dch is mapped is determined in advance, the base station allocates Dchs to resource blocks first and then allocates Lchs to resource blocks to prevent collision between Dch allocation and Lch allocation.

Here, when the base station allocates a plurality of Dchs to one mobile station, frequency diversity effect does not substantially change no matter which Dch is allocated to resource blocks, and therefore a plurality of Dchs with continuous channel numbers are allocated. Thus, by indicating only the first channel number and the last channel number among the continuous channel numbers from the base station to the mobile station, the mobile station can judge the Dchs allocated to that mobile station. Therefore, it is possible to reduce control information for indicating the Dch allocation result.

On the other hand, when the base station allocates Lchs, the base station reports the RBs to which Lchs have been allocated to the mobile station through a bitmap-type allocation report to allocate Lchs to RBs of high quality. Here, the base station groups a plurality of RBs into a plurality of RB groups, allocates Lchs in RB group units, and thereby reduce control information for indicating the Lch allocation result. For example, in a system with 14 RBs, mapping per RB requires 14 bits of control information, but allocation in RB group units formed with 2 RBs requires only 7 bits of control information.

However, when Dchs are mixed with Lchs, if the RB interval between RBs to which one Dch is mapped is assumed to be the floor (the number of all RBs/2), there may be a case where Lchs cannot be allocated in RB group units.

Therefore, there can be some unoccupied RBs and the utilization efficiency of communication resources may deteriorate. As a result, the system throughput deteriorates. Here, allocating unused and unoccupied RBs to Lchs uses Lch allocation in RB units. However, the amount of control information for indicating the Lch allocation result becomes enormous and the system throughput deteriorates as a consequence.

For example, when 14 consecutive RBs #1 to #14 in the frequency domain are each divided into two subblocks, and continuous channel numbers Dchs #1 to #14 are associated with RBs #1 to #14, one Dch is mapped at intervals of 7 (=floor(14/2)) RBs. That is, Dchs #1 to #7 are associated with one subblock of RBs #1 to #7 and Dchs #8 to #14 are associated with the other subblock of RBs #1 to #7. Likewise, Dchs #1 to #7 are associated with one subblock of RBs #8 to #14 and Dchs #8 to #14 are associated with the other subblock of RBs #8 to #14. Thus, Dch #1 is formed with the subblock of RB #1 and the subblock of RB #8, and Dch #2 is formed with the subblock of RB #2 and the subblock of RB #9. The same applies to Dchs #3 to #14.

Here, when two Dchs (e.g., Dch #1 and Dch #2) are allocated, Dchs are allocated to RBs #1, #2, #8 and #9 and Lchs are allocated to the rest of the RBs. When Lchs are allocated to units of one RB group, each including two RBs, Lchs are allocated to the RB groups of (RBs #3 and #4), (RBs #5 and #6), (RBs #11 and #12) and (RBs #13 and #14). However, in the case of RB #7 and RB #10, since the other RBs constituting their respective RB groups are allocated to Dchs, Lchs cannot be allocated to RB #7 and RB #10. Thus, some RBs may remain unoccupied without being used, causing the utilization efficiency of communication resources to deteriorate and thereby leading to deterioration of system throughput. Here, allocating RBs (RB #7 and RB #10) that may remain unoccupied without being used to Lchs uses Lch allocation in RB units. However, Lch allocation in RB units causes the amount of control information for indicating the Lch allocation result to become enormous, leading to deterioration of system throughput as a consequence.

An embodiment provides a channel mapping method for frequency diversity transmission and a base station capable of preventing deterioration of system throughput due to deterioration in utilization efficiency of communication resources when carrying out frequency scheduling transmission and frequency diversity transmission at the same time in multicarrier communication.

An embodiment of a channel mapping method divides a plurality of subcarriers comprised of a multicarrier signal into a plurality of resource blocks and groups the plurality of resource blocks into a plurality of groups so that one distributed channel is mapped at intervals of an integer multiple of the number of resource blocks constituting one group in the plurality of resource blocks.

An embodiment facilitates preventing of deterioration of the utilization efficiency of communication resources when carrying out frequency scheduling transmission and frequency diversity transmission at the same time in multicarrier communication.

DETAILED DESCRIPTION

Embodiments will be described below in detail with reference to the accompanying drawings.

Figure 1:
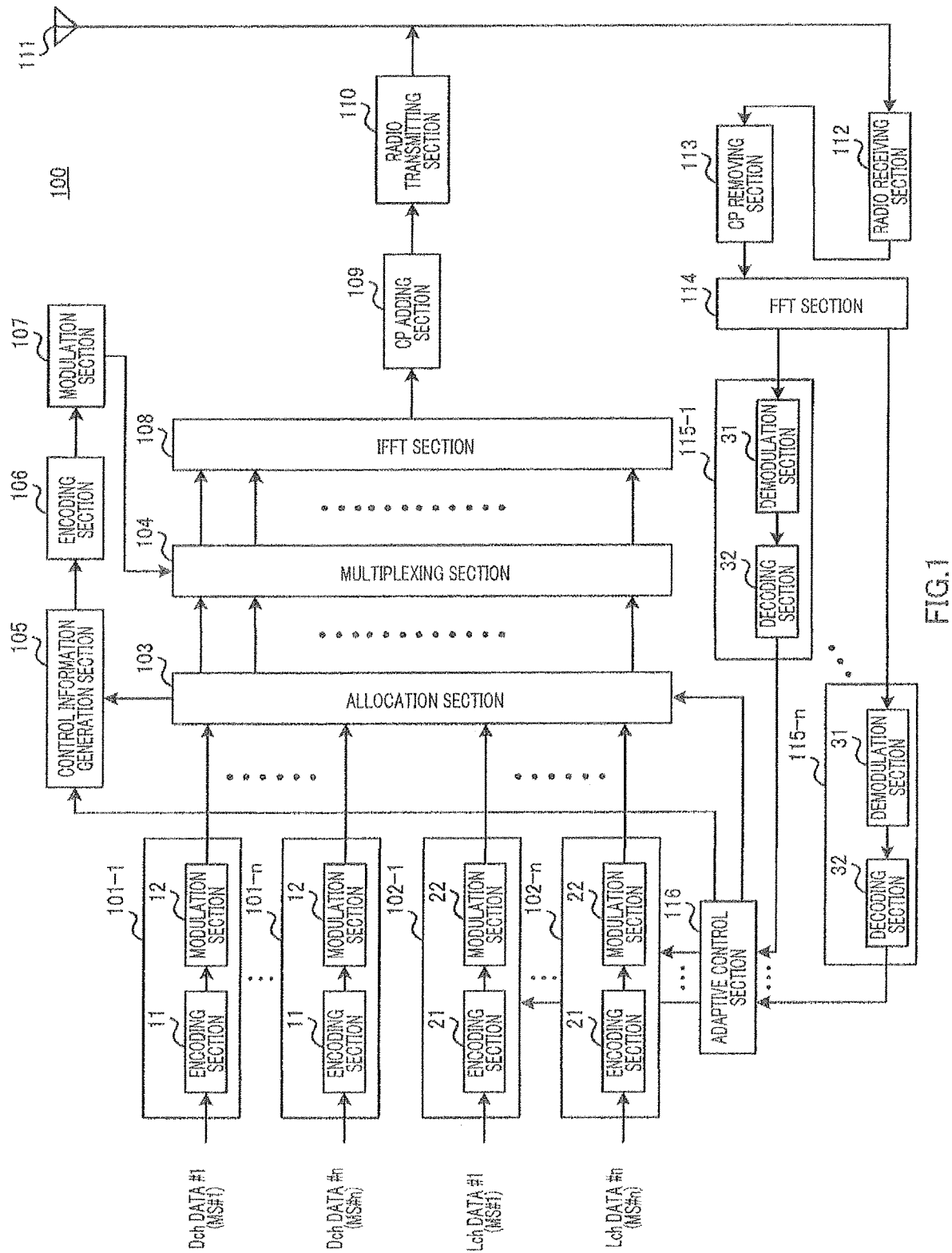
FIG. 1 is a block diagram illustrating a configuration of a base station according to an embodiment.

FIG. 1 illustrates a configuration of base station 100 according to an example embodiment. Base station 100 divides a plurality of subcarriers comprised of an OFDM symbol, which is a multicarrier signal, into a plurality of RBs and uses Dch and Lch for each RB of the plurality of RBs. Furthermore, one of Dch and Lch is allocated to one mobile station in the same subframe.

Base station 100 is provided with n (n is the number of mobile stations (MSs) with which base station 100 can communicate) encoding/modulation sections 101-1 to 101-$n$ each comprising encoding section 11 and modulation section 12 for Dch data, n encoding/modulation sections 102-1 to 102-$n$ each comprising encoding section 21 and modulation section 22 for Lch data and n demodulation/decoding sections 115-1 to 115-$n$ each comprising demodulation section 31 and decoding section 32.

In encoding/modulation sections 101-1 to 101-$n$, encoding section 11 performs encoding processing using a turbo code or the like on Dch data #1 to #n for each of mobile stations #1 to #n and modulation section 12 performs modulation processing on the encoded Dch data to thereby generate a Dch data symbol.

In encoding/modulation sections 102-1 to 102-$n$, encoding section 21 performs encoding processing using a turbo code or the like on Lch data #1 to #n for each of mobile stations #1 to #n and modulation section 22 performs modulation processing on the encoded Lch data to thereby generate an Lch data symbol. The coding rate and modulation scheme in this case follows MCS (Modulation and Coding Scheme: MCS) information inputted from adaptive control section 116.

Allocation section 103 allocates the Dch data symbol and Lch data symbol to each subcarrier comprised of an OFDM symbol according to the control from adaptive control section 116 and outputs the OFDM symbol to multiplexing section 104. In this case, allocation section 103 collectively allocates the Dch data symbols and Lch data symbols for each RB. Furthermore, when allocating the Lch data symbols, allocation section 103 groups the plurality of RBs into a plurality of groups and allocates Lchs in RB group units. Furthermore, when using a plurality of Dchs for the Dch data symbol of one mobile station, allocation section 103 uses Dchs with continuous channel numbers. Furthermore, allocation section 103 allocates the Dch data symbol to a plurality of RBs to which one Dch is mapped at intervals of an integer multiple of the number of RBs constituting one RB group. In each RB, the mapping positions of Dch and Lch are associated with each other in advance. That is, allocation section 103 stores a mapping pattern, which is the association between Dchs and Lchs, and RBs in advance and allocates the Dch data symbol and Lch data symbol to each RB according to the mapping pattern. Details of the Dch mapping method according to the present embodiment will be described later. Furthermore, allocation section 103 outputs allocation information of the Dch data symbol (information indicating which mobile station's Dch data symbol is allocated to which RB s) and allocation information of the Lch data symbol (information indicating which RB s are allocated to the Lch data symbol of which mobile station) to control information generation section 105. For example, the allocation information of the Dch data symbol only includes the first channel number and the last channel number of the continuous channel numbers.

Control information generation section 105 generates control information including the allocation information of the Dch data symbol, allocation information of the Lch data symbol and MCS information inputted from adaptive control section 116 and outputs the control information to encoding section 106.

Encoding section 106 performs encoding processing on the control information and modulation section 107 performs modulation processing on the encoded control information and outputs the control information to multiplexing section 104.

Multiplexing section 104 multiplexes each data symbol inputted from allocation section 103 with control information and outputs the multiplexing result to IFFT (inverse Fast Fourier Transform) section 108. Multiplexing of control information is performed, for example, every subframe. According to the present embodiment, multiplexing of control information may be one of time domain multiplexing and frequency domain multiplexing.

IFFT section 108 performs IFFT on a plurality of subcarriers comprised of a plurality of RBs to which control information and data symbol are allocated, to generate an OFDM symbol, which is a multicarrier signal.

CP (Cyclic Prefix) adding section 109 adds the same signal as the last portion of the OFDM symbol to the head of the OFDM symbol as a CP.

Radio transmitting section 110 performs transmission processing such as D/A conversion, amplification and up-conversion on the OFDM symbol with a CP and transmits the OFDM symbol from antenna 111 to each mobile station.

On the other hand, radio receiving section 112 receives n OFDM symbols at the same time transmitted from maximum n mobile stations via antenna 111 and performs reception processing such as down-conversion, A/D conversion on these OFDM symbols.

CP removing section 113 removes the CP from the OFDM symbol after the reception processing.

FFT (Fast Fourier Transform) section 114 performs FFT on the OFDM symbol without a CP to obtain a signal for each mobile station multiplexed in the frequency domain. Here, the respective mobile stations transmit signals using subcarriers different from each other or RBs different from each other and a signal for each mobile station includes received quality information for each RB reported from each mobile station. Each mobile station can measure the received quality of each RB using received SNR, received SIR, received SINR, received CINR, received power, interference power, bit error rate, throughput and MCS or the like that can achieve a certain error rate. Furthermore, the received quality information may be expressed as "CQI" (Channel Quality Indicator), "CSI" (Channel State Information) and so on.

In demodulation/decoding sections 115-1 to 115-$n$, demodulation section 31 performs demodulation processing on the signal after the FFT and decoding section 32 performs decoding processing on the demodulated signal. The received data is thereby obtained. Of the received data, the received quality information is inputted to adaptive control section 116.

Adaptive control section 116 performs adaptive control over Lch data based on the received quality information for each RB reported from each mobile station. That is, for encoding/modulation sections 102-1 to 102-$n$, adaptive control section 116 selects MCS whereby a required error rate can be satisfied for each RB group based on the received quality information for each RB and outputs the MCS information, and for allocation section 103, adaptive control section 116 performs frequency scheduling to determine to which RB group Lch data #1 to #n should be allocated respectively using a scheduling algorithm such as a Max SIR method or Proportional Fairness method. Furthermore, adaptive control section 116 outputs MCS information for each RB group to control information generation section 105.

Figure 2:
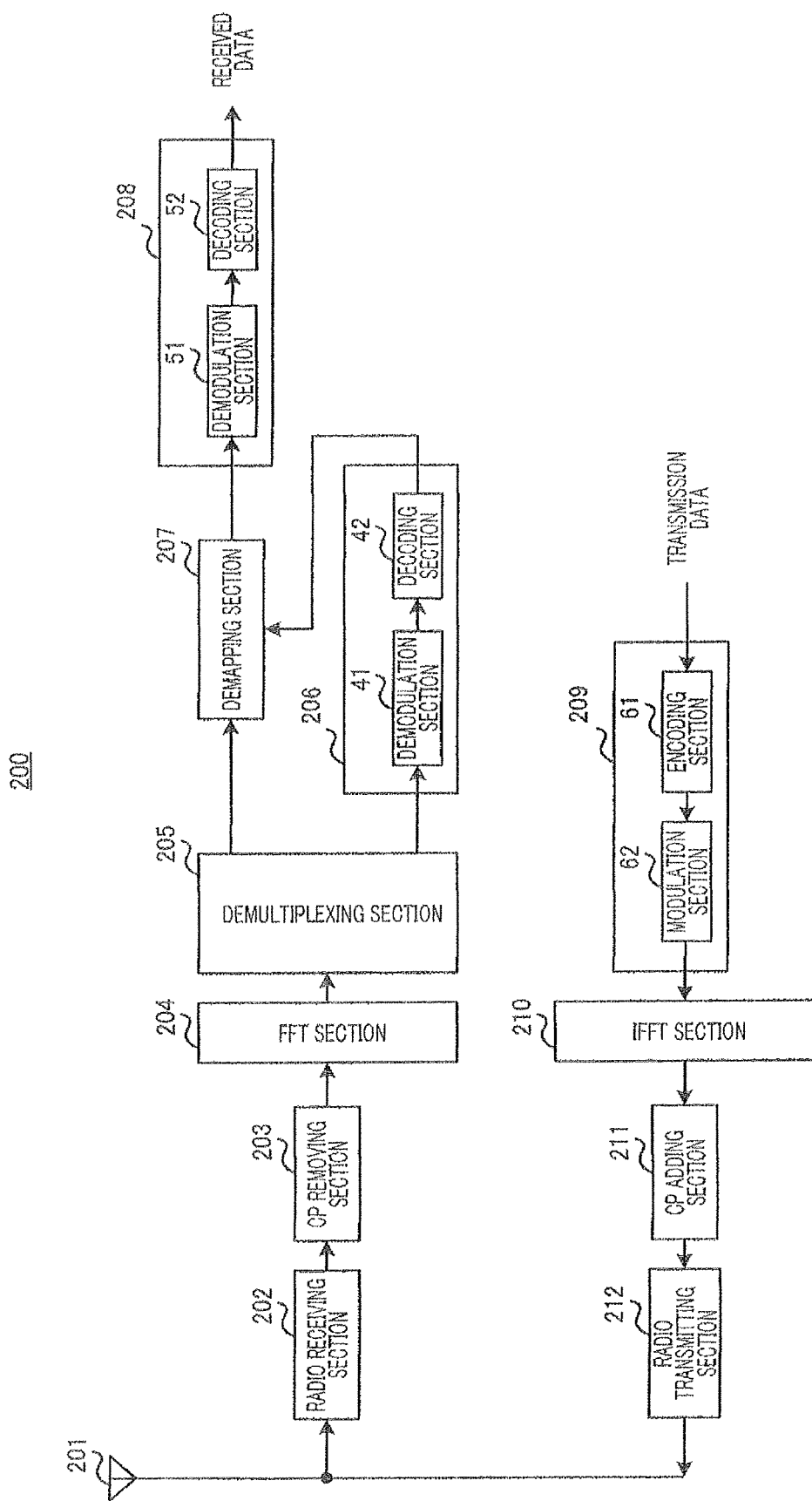
FIG. 2 is a block diagram illustrating a configuration of a mobile station according to the embodiment.

Next, the configuration of mobile station 200 according to the present embodiment is shown in FIG. 2. Mobile station 200 receives a multicarrier signal, which is an OFDM symbol comprised of a plurality of subcarriers divided into a plurality of RBs, from base station 100 (FIG. 1). Furthermore, Dch and Lch are used for each RB in a plurality of RBs. Furthermore, one of Dch and Lch is allocated to mobile station 200 in the same subframe.

In mobile station 200, radio receiving section 202 receives the OFDM symbol transmitted from base station 100 via antenna 201 and performs reception processing such as down-conversion or A/D conversion on the OFDM symbol.

CP removing section 203 removes CP from the OFDM symbol after the reception processing.

FFT section 204 performs FFT on the OFDM symbol without a CP to obtain a received signal in which control information and data symbols are multiplexed.

Demultiplexing section 205 demultiplexes the received signal after the FFT into a control signal and data symbol. Demultiplexing section 205 then outputs the control signal to demodulation/decoding section 206 and outputs the data symbol to demapping section 207.

In demodulation/decoding section 206, demodulation section 41 performs demodulation processing on the control signal and decoding section 42 performs decoding processing on the demodulated signal. Here, the control information includes Dch data symbol allocation information, Lch data symbol allocation information and MCS information. Demodulation/decoding section 206 then outputs the Dch data symbol allocation information and the Lch data symbol allocation information out of the control information to demapping section 207.

Demapping section 207 extracts the data symbol allocated to that mobile station from among the plurality of RB s to which data symbols inputted from demultiplexing section 205 are allocated based on the allocation information inputted from demodulation/decoding section 206. In each RB, mapping positions of Dchs and Lchs are associated with each other in advance as with base station 100 (FIG. 1). That is, demapping section 207 stores the same mapping pattern as that of allocation section 103 of base station 100 and extracts Dch data symbols and Lch data symbols from a plurality of RBs according to the mapping pattern. Furthermore, when extracting the Lch data symbol, demapping section 207 extracts Lchs in RB group units in which a plurality of RBs are grouped into a plurality of groups. Furthermore, as described above, when a plurality of Dchs are used for a Dch data symbol of one mobile station, allocation section 103 of base station 100 (FIG. 1) uses Dchs with continuous channel numbers. Furthermore, the allocation information included in the control information from base station 100 indicates only the first channel number and the last channel number among the continuous channel numbers of Dchs used for the Dch data symbol. Thus, demapping section 207 specifies Dchs used for the Dch data symbol allocated to that mobile station based on the first channel number and the last channel number indicated in the allocation information. To be more specific, demapping section 207 identifies a plurality of continuous Dchs from the first channel number indicated in the allocation information to the last channel number indicated in the allocation information as Dchs used for the Dch data symbol allocated to that mobile station. Demapping section 207 then extracts the RB associated with the specified channel number of the identified Dch and outputs the data symbol allocated to the extracted RB to demodulation/decoding section 208.

In demodulation/decoding section 208, demodulation section 51 performs demodulation processing on the data symbol inputted from demapping section 207 and decoding section 52 performs decoding processing on the demodulated signal. The received data is thereby obtained.

On the other hand, in encoding/modulation section 209, encoding section 61 performs encoding processing using a turbo code or the like on the transmission data and modulation section 62 performs modulation processing on the encoded transmission data to generate a data symbol. Here, mobile station 200 transmits transmission data using subcarriers or RBs different from those of other mobile stations and the transmission data includes receiving quality information for each RB.

IFFT section 210 performs IFFT on a plurality of subcarriers comprised of a plurality of RBs to which data symbols inputted from encoding/modulation section 209 are allocated, to generate an OFDM symbol, which is a multicarrier signal.

CP adding section 211 adds the same signal as the last portion of the OFDM symbol to the head of the OFDM symbol as a CP.

Radio transmitting section 212 performs transmission processing such as D/A conversion, amplification and up-conversion on the OFDM symbol with a CP and transmits the OFDM symbol to base station 100 (FIG. 1) from antenna 201.

Figure 3:
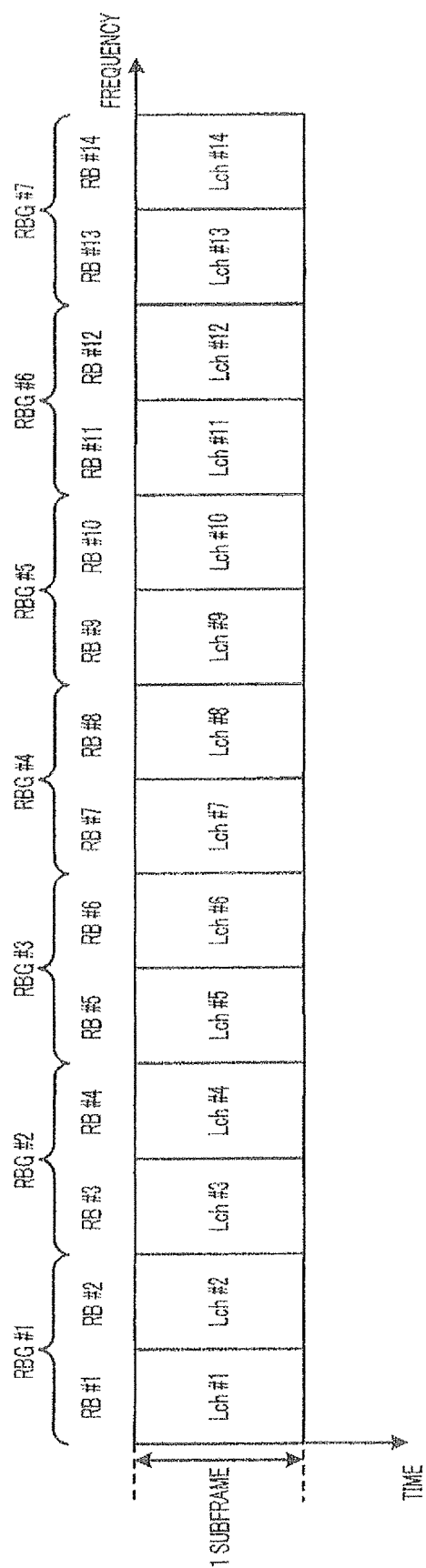
FIG. 3 illustrates an Lch mapping method according to the embodiment.

Next, the Dch channel mapping method according to the present embodiment will be described. In the following explanations, a case will be described as an example of configuration where a plurality of subcarriers comprised of one OFDM symbol are uniformly divided into 14 RBs of RBs #1 to #14 as shown in FIG. 3. Furthermore, Lch #1 to #14 or Dch #1 to #14 is formed with each RB and adaptive control section 116 controls channels used by each mobile station. Furthermore, Lchs are allocated to each mobile station in RB group units. Here, as shown in FIG. 3, RBs #1 to #14 are grouped into RB groups RBGs #1 to #7. Here, suppose the number of RBs constituting one RB group (hereinafter referred to as "RB group size") is 2. Therefore, as shown in FIG. 3, Lch #1 and Lch #2 mapped to RB #1 and RB #2 constituting RBG1 are always allocated at the same time and Lch #3 and Lch #4 mapped to RB #3 and RB #4 constituting RBG2 are always allocated at the same time. The same applies to Lchs #5 to #14 constituting RBGs #3 to #7 respectively. Furthermore, the Lch configuration in each RB shown in FIG. 3 and the Dch configuration in each RB shown below are associated with each other in advance in allocation section 103.

Here, since frequency scheduling is performed on Lch in RB units, each RB used for Lch includes an Lch data symbol for only one mobile station. That is, one Lch corresponding to one mobile station is formed with one RB. Therefore, as shown in FIG. 3, Lchs #1 to #12 are mapped to RBs #1 to #12 respectively. That is, the allocation unit of each Lch is "1 RB×1 subframe."

On the other hand, since frequency diversity transmission is carried out for Dch, RB used for Dch includes a plurality of Dch data symbols. Here, each RB used for Dch is temporally divided into two subblocks and different Dchs are mapped to each subblock. That is, a plurality of different Dchs are time-domain-multiplexed in 1 RB. Furthermore, one Dch is formed with two different RB subblocks. That is, the allocation unit of each Dch is "(1 RB×½ subframe)×2" and is the same as the allocation unit of each Lch.

Figure 4:
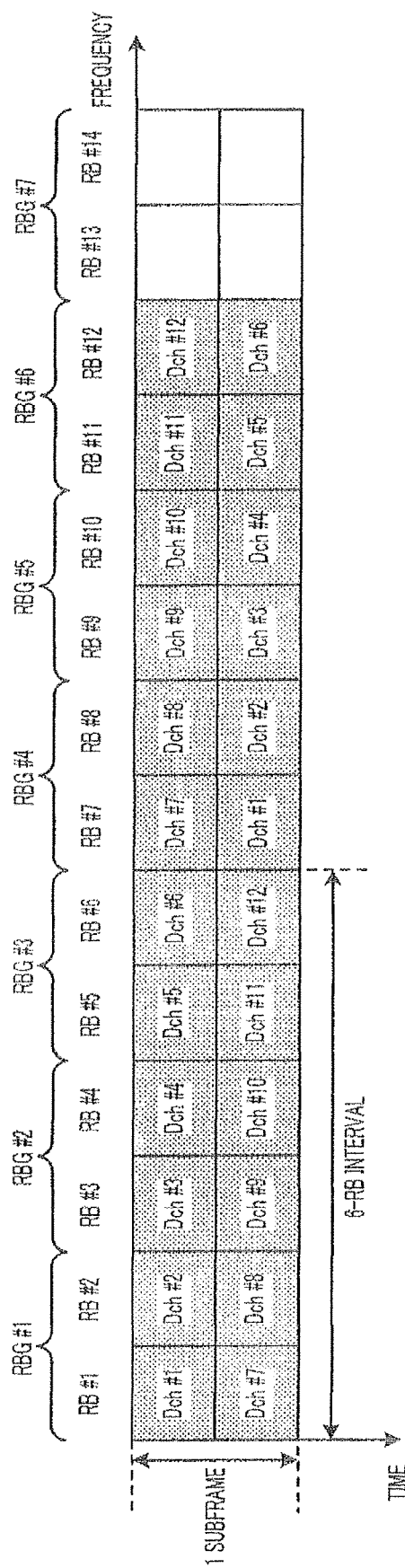
FIG. 4 illustrates a Dch mapping method according to mapping method 1 of an embodiment.

Mapping Method 1 (FIG. 4)

In the present mapping method, one Dch is mapped at intervals of an integer multiple of the RB group size for a plurality of RBs.

That is, the RB interval Gap of RBs in which one Dch is mapped is given by following equation 1,

[1]

$$\mathrm{Gap}=\mathrm{floor}((Nrb/Nd)/\mathrm{RBGsize})\cdot \mathrm{RBGsize} \quad \text{(Equation 1)}$$

where Nrb is the number of all RBs, Nd is the number of subblocks into which one RB is divided and RBGsize is the RB group size.

Next, the relational expression between the channel number of Dch and an RB number of RB in which the Dch is mapped is shown. Nd RB numbers (indexes) j in which Dch #k (k=1 to 12) are mapped are given by following equation 2.

[2]

$$j=(((k-1)+\mathrm{Gap}\cdot p)\bmod(\mathrm{Gap}\cdot Nd))+1, p=0,1,\ldots,Nd-1 \quad \text{(Equation 2)}$$

Here, since Nrb=14, Nd=2, RBGsize=2, RB interval Gap is 6 (=floor((14/2)/2)×2) according to equation 1. Therefore, equation 2 above is j=(((k−1)+6·p)mod 12)+1 (p=0, 1), where k=1, 2, . . . , 12. Thus, one Dch is mapped in a distributed manner to two RBs of RB #(k) and RB #(k+6) which are 6 RBs apart in the frequency domain. In other words, one Dch is distributedly mapped to RBs 6 RBs apart which is an integer multiple (here, three times) of the RB group size (RBGsize=2) in the frequency domain. This RB interval (RB interval 6) is a maximum interval equal to or below Nrb/Nd (=14/2) among intervals of integer multiples of the RB group size (RBGsize=2).

To be more specific, as shown in FIG. 4, Dchs #1 and #7 are mapped to RB #1 (RB #7), Dchs #2 and #8 are mapped to RB #2 (RB #8), Dchs #3 and #9 are mapped to RB #3 (RB #9), Dchs #4 and #10 are mapped to RB #4 (RB #10), Dchs #5 and #11 are mapped to RB #5 (RB #11) and Dchs #6 and #12 are mapped to RB #6 (RB #12). That is, according to the present mapping method, the maximum number of Dchs that allocation section 103 can allocate to RBs is 12.

Figure 5:
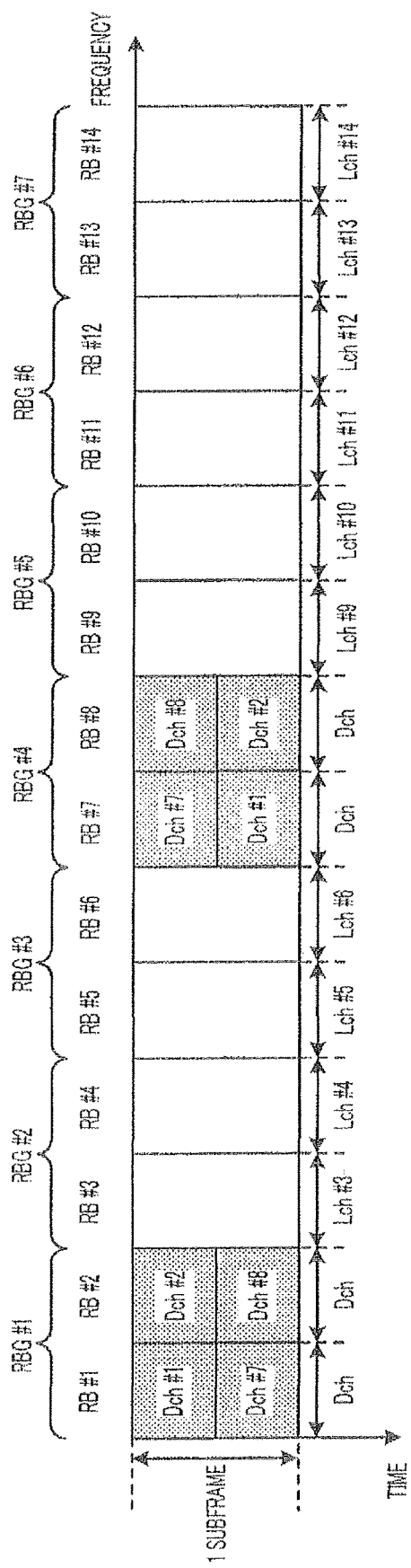
FIG. 5 illustrates an allocation example according to mapping method 1 of an embodiment.

Next, FIG. 5 illustrates an allocation example in allocation section 103 (FIG. 1) of base station 100 when four Dchs are allocated to a Dch data symbol of one mobile station. Here, for simplicity of explanation, Dch #1, #2, #7 and #8 are allocated so that no odd subblocks are produced in RBs used for Dchs. Furthermore, allocation section 103 stores the Dch mapping pattern shown in FIG. 4 in advance and allocates Dch data symbols to RBs according to the mapping pattern shown in FIG. 4.

As shown in FIG. 5, allocation section 103 allocates Dch data symbols to the subblock of RB #1 and subblock of RB #7 constituting Dch #1, the subblock of RB #2 and subblock of RB #8 constituting Dch #2, the subblock of RB #1 and subblock of RB #7 constituting Dch #7, and the subblock of RB #2 and subblock of RB #8 constituting Dch #8. That is, as shown in FIG. 5, Dch data symbols are allocated to RBs #1, #2, #7 and #8. Therefore, four Dchs are allocated to RB subblocks RBs #1 and #2 constituting RBG1, and RBs #7 and #8 constituting RBG4 covering all RBs.

Furthermore, as shown in FIG. 5, allocation section 103 allocates Lch data symbols to the rest of the RBs other than the RBs to which Dch data symbols are allocated, that is, RBs #3 to #6 and RBs #9 to #14. As described above, each Lch is allocated to RB group units. Thus, as shown in FIG. 5, allocation section 103 allocates Lch data symbols to RB #3 and RB #4 constituting RBG2 in which Lch #3 and Lch #4 are mapped respectively, RB #5 and RB #6 constituting RBG3 in which Lch #5 and Lch #6 are mapped respectively, RB #9 and RB #10 constituting RBG5 in which Lch #9 and Lch #10 are mapped respectively, RB #11 and RB #12 constituting RBG6 in which Lch #11 and Lch #12 are mapped respectively and RB #13 and RB #14 constituting RBG7 in which Lch #13 and Lch #14 are mapped respectively. That is, Lchs #3 to #6 and Lchs #9 to #14 shown in FIG. 3 are used for Lch data symbols. Thus, when Lch data symbols are allocated to RBs other than the RBs to which Dch data symbols are allocated, allocation section 103 can allocate Lch data symbols in RB group units covering all RBs.

Next, an extraction example in demapping section 207 of mobile station 200 (FIG. 2) will be described where Dch data symbols using four Dchs are allocated to mobile station 200. Here, for simplicity of explanation, Dchs #1, #2, #7 and #8 are used for Dch data symbols so that no odd subblocks are produced in RBs. Furthermore, as with allocation section 103, demapping section 207 stores the Dch mapping pattern shown in FIG. 4 in advance and extracts Dch data symbols from a plurality of RBs according to the mapping pattern shown in FIG. 4.

As with allocation section 103, as shown in FIG. 5, demapping section 207 extracts Dch #1 formed with the subblock of RB #1 and the subblock of RB #7, Dch #2 formed with the subblock of RB #2 and the subblock of RB #8, Dch #7 formed with the subblock of RB #1 and the subblock of RB #7 and Dch #8 formed with the subblock of RB #2 and the subblock of RB #8. That is, as shown in FIG. 5, demapping section 207 extracts Dch data symbols allocated to RBs #1, #2, #7 and #8 as data symbols directed to the subject station. In other words, as shown in FIG. 5, demapping section 207 extracts four Dchs allocated to RBG1 formed with RBs #1 and #2 and RBG4 formed with RBs #7 and #8 covering all RBs as data symbols directed to the subject station.

Thus, according to the present mapping method, the RB interval of RBs to which one Dch is mapped is set to an integer multiple of the RB group size of the RB group used for Lch allocation (three times in the present mapping method). When Lchs are allocated to the rest of the RBs after Dchs are allocated, this allows the base station to allocate Lchs in RB group units without producing any RBs that cannot be used. Therefore, according to the present mapping method, even when frequency scheduling transmission and frequency diversity transmission are at the same time carried out, it is possible to prevent the system throughput from deteriorating due to deterioration of the utilization efficiency of communication resources. Furthermore, according to the present mapping method, Lchs can be allocated without producing any unoccupied RBs and the throughput of Lchs can therefore be improved. Furthermore, according to the present mapping method, Lchs are allocated to RB group units, and therefore the amount of control information for indicating the Lch allocation result can be reduced.

Here, with 14 RBs (RBs #1 to #14) shown in FIG. 4, a maximum of 14 Dchs can be allocated. By contrast, according to the present mapping method, a maximum of 12 Dchs can be allocated as described above. That is, according to the present mapping method, the number of Dchs that can be allocated are reduced by an amount corresponding to the RB group size (two Dchs in FIG. 4) at a maximum. However, since the applications of Dchs are limited to data communication when a mobile station moves at a high speed or the like, it is extremely rare that Dchs are allocated to all RBs. Therefore, there is substantially no deterioration of system throughput due to a decrease in the number of Dchs that can be allocated using the present mapping method. Moreover, the improvement in the system throughput by allocating Lchs without producing any unoccupied RBs # using the present mapping method becomes more significant than the deterioration of system throughput.

Figure 6:
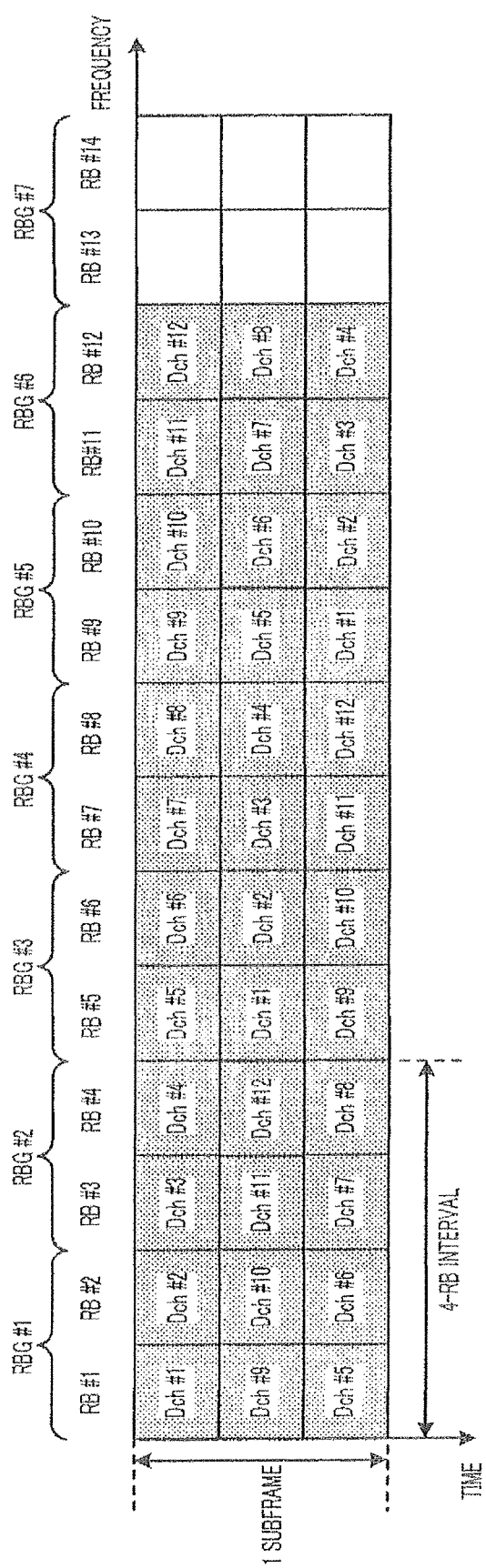
FIG. 6 illustrates a Dch mapping method according to mapping method 1 of an embodiment (case of division into three portions)

Although a case has been described in the present mapping method where one RB is divided into two portions when Dchs are used, the number of divisions is not limited to 2, and one RB may be divided into three portions. For example, FIG. 6 illustrates a mapping method where one RB is divided into three portions when Dchs are used. In the mapping method illustrated in FIG. 6, when, for example, six Dchs are mapped, Dchs can be mapped within RB groups covering all RB subblocks, and therefore effects similar to those of the present mapping method can be obtained. Furthermore, as shown in FIG. 6, since one Dch is configured distributed across three RBs, the diversity effect can be improved more than the case of division into two portions.

Figure 7:
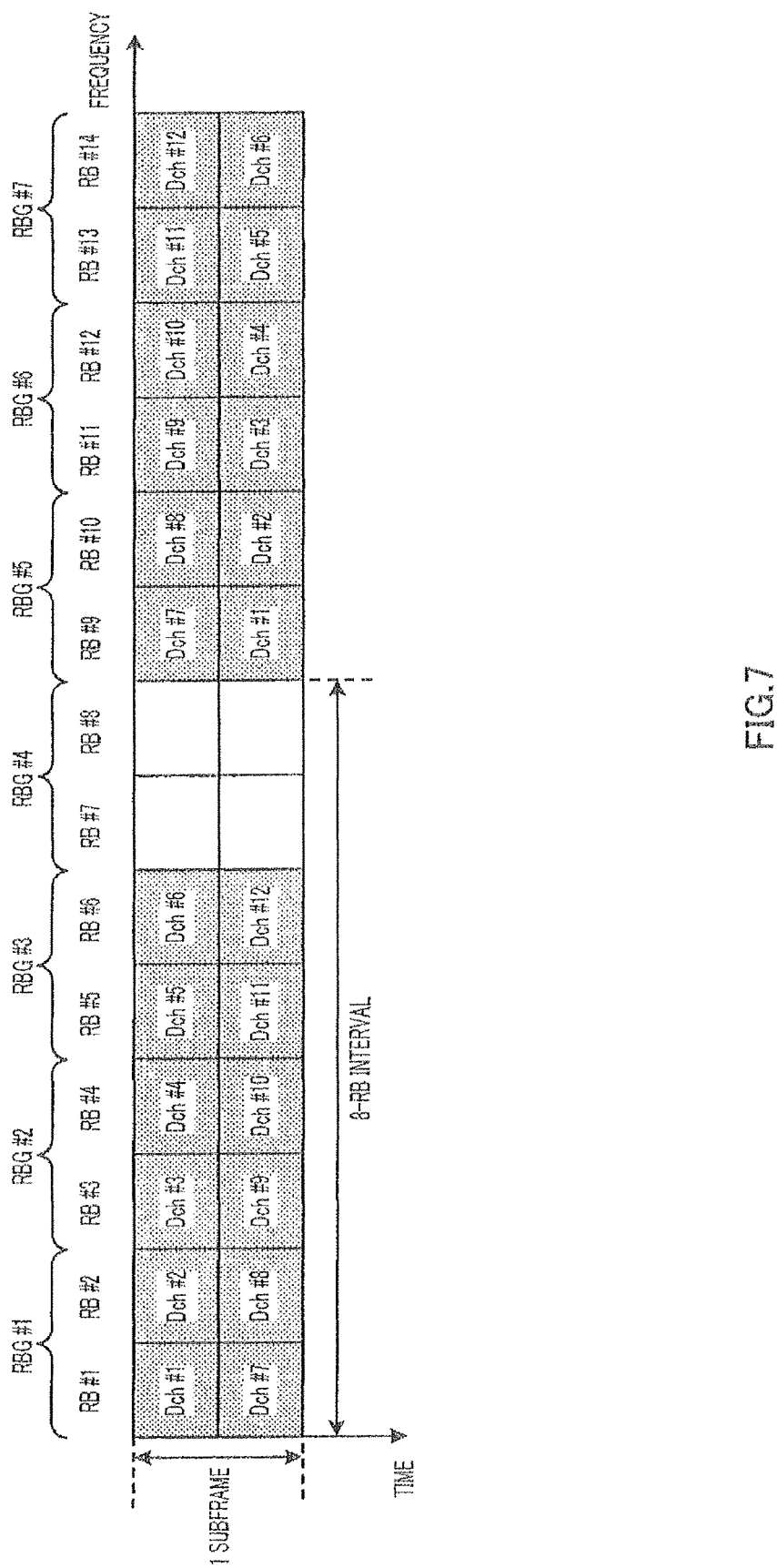
FIG. 7 illustrates a Dch mapping method according to mapping method 2 of an embodiment.

Mapping Method 2 (FIG. 7)

The present mapping method is the same as mapping method 1 in that one Dch is mapped at intervals of an integer multiple of the RB group size among a plurality of RBs, but the present mapping method is different from mapping method 1 in that one Dch is mapped at the maximum interval among possible intervals of integer multiples of the RB group size.

That is, RB interval Gap between RBs to which one Dch is mapped is given by following equation 3.

[3]
$$Gap = floor((Nrb - Wgap \cdot Nd)/RBGsize) \cdot RBGsize + Wgap \quad \text{(Equation 3)}$$

where, $Wgap = floor((Nrb/Nd)/RBGsize) \cdot RBGsize$ and is equivalent to equation 1.

Nd RB numbers (indexes) j to which Dch #k (k=1 to 12) are mapped are given by equation 4.

[4]
$$j = ((k-1) \bmod (Wgap)) + 1 + Gap \cdot p, p = 0, 1, \ldots, Nd-1 \quad \text{(Equation 4)}$$

where, Dchs of $k=1, 2, \ldots$, Wgap are mapped to the first-half RB subblocks and Dchs of k=Wgap+1, Wgap+2, Wgap×Nd are mapped to the last-half RB subblocks.

Here, since Nrb=14, Nd=2, RBGsize=2 and Wgap=6, the RB interval Gap is 8 (=floor((14/2)/2)×2+6) according to equation 3. Therefore, above equation 4 becomes j=((k-1) mod(6))+8×p (p=0, 1). where, k=1, 2, . . . , 12. Thus, one Dch is mapped in a distributed manner to two RBs of RB #(k) and RB #(k+8) which are 8 RBs apart in the frequency domain. In other words, one Dch is distributedly mapped to RBs 8 RBs apart which is an integer multiple (here, four times) of the RB group size (RBGsize=2) in the frequency domain. Furthermore, according to the present mapping method (Equation 3), the RB interval increases by the number of RBs of RB groups to which Dchs are not allocated compared to the RB interval (Equation 1) of mapping method 1. To be more specific, according to mapping method 1 (FIG. 4), Dchs are not mapped to two RBs of RBs #13 and #14. Therefore, the RB interval Gap according to the present mapping method becomes 8 RBs which is greater by 2 RBs than the RB interval of 6 RBs according to mapping method 1. This is because, according to mapping method 1 (FIG. 4), RBs in which no Dch is mapped are allocated to an end of all the RBs, whereas according to the present mapping method, RBs in which no Dch is mapped are allocated at the central part of all the RBs.

To be more specific, as shown in FIG. 7, Dchs #1 and #7 are mapped to RB #1 (RB #9), Dchs #2 and #8 are mapped to RB #2 (RB #10), Dchs #3 and #9 are mapped to RB #3 (RB #11), Dchs #4 and #10 are mapped to RB #4 (RB #12), Dchs #5 and #11 are mapped to RB #5 (RB #13), and Dchs #6 and #12 are mapped to RB #6 (RB #14). That is, according to the present mapping method, the maximum number of Dchs that can be allocated to RBs by allocation section 103 is 12 as with mapping method 1. Furthermore, according to mapping method 1 (FIG. 4), RBs in which no Dch is mapped are last RBs #13 and #14 of RBs #1 to #14, whereas according to the present mapping method, RBs in which no Dch is mapped are RBs #7 and #8 as shown in FIG. 7. That is, no Dch is mapped to the central part of all the RBs. Thus, two RB subblocks constituting each Dch are mapped extending to a maximum extent over RBs #1 to #6 and RBs #9 to #14 on both sides of RBs #7 and #8. That is, Dchs #1 to #12 are mapped at a maximum interval (interval of 8 RBs) among possible intervals of integer multiples of the RB group size out of 14 RBs.

Figure 8:
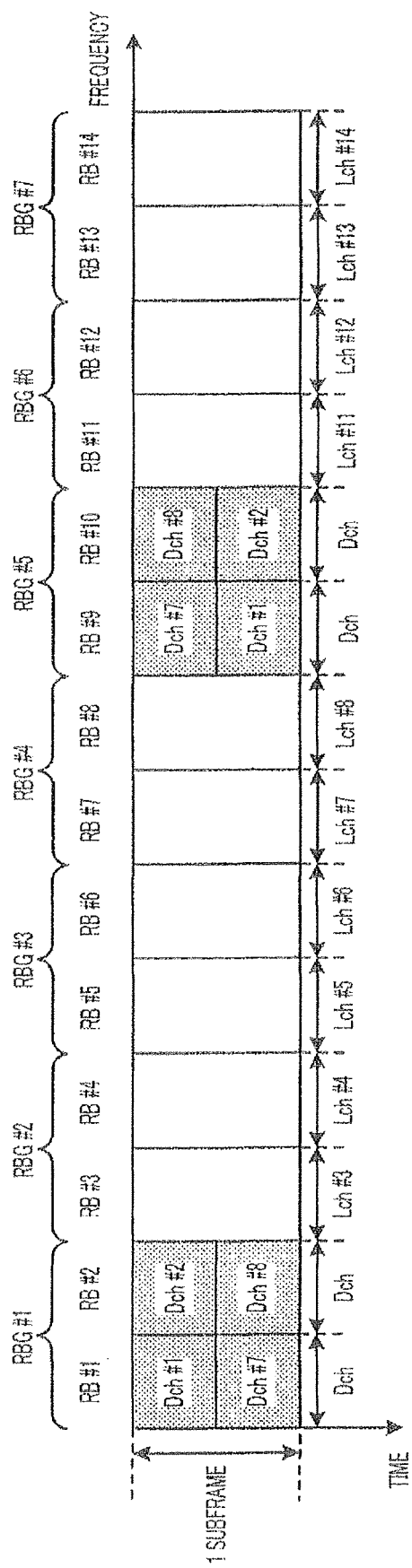
FIG. 8 illustrates an allocation example according to mapping method 2 of an embodiment.

Next, as with mapping method 1, FIG. 8 illustrates a mapping example where four Dchs are used for Dch data symbols of one mobile station. Here, Dchs #1, #2, #7 and #8 are allocated as with mapping method 1. Furthermore, allocation section 103 stores the Dch mapping pattern shown in FIG. 7 in advance and allocates Dch data symbols to RBs according to the mapping pattern shown in FIG. 7.

As shown in FIG. 8, allocation section 103 allocates Dch data symbols to the subblock of RB #1 and the subblock of RB #9 constituting Dch #1, the subblock of RB #2 and the subblock of RB #10 constituting Dch #2, the subblock of RB #1 and the subblock of RB #9 constituting Dch #7, and the subblock of RB #2 and the subblock of RB #10 constituting Dch #8. That is, Dch data symbols are allocated to RBs #1, #2, #9 and #10 as shown in FIG. 8. That is, the four Dchs are allocated to RBs #1 and #2 constituting RBG1, and RBs #9 and #10 constituting RBG5 covering all RB subblocks.

Furthermore, as shown in FIG. 8, allocation section 103 allocates Lch data symbols to the rest of the RBs #3 to #8 and RBs #11 to #14 other than the RBs to which the Dch data symbols have been allocated. Here, allocation section 103 allocates Lch data symbols in RB group units as with mapping method 1. To be more specific, as shown in FIG. 8, allocation section 103 allocates Lch data symbols to two RBs constituting RBGs #2, #3, #4, #6 and #7 respectively. That is, Lchs #3 to #8 and Lchs #11 to #14 shown in FIG. 3 are used for the Lch data symbols. Thus, when allocating Lch data symbols to blocks other than the RBs to which the Dch data symbols have been allocated, allocation section 103 can allocate the Lch data symbols in RB group units covering all RBs as with mapping method 1.

Next, an extraction example in demapping section 207 of mobile station 200 (FIG. 2) will be described where Dch data symbols using four Dchs are allocated to mobile station 200. Here, Dchs #1, #2, #7 and #8 are used for Dch data symbols as with mapping method 1. Furthermore, demapping section 207 stores the Dch mapping pattern shown in FIG. 7 in advance as with allocation section 103 and extracts Dch data symbols from a plurality of RBs according to the mapping pattern shown in FIG. 7.

As with allocation section 103, as shown in FIG. 8, demapping section 207 extracts Dch #1 formed with the subblock of RB #1 and the subblock of RB #9, Dch #2 formed with the subblock of RB #2 and the subblock of RB #10, Dch #7 formed with the subblock of RB #1 and the subblock of RB #9, and Dch #8 formed with the subblock of RB #2 and the subblock of RB #10. That is, as shown in FIG. 8, demapping section 207 extracts Dch data symbols allocated to RBs #1, #2, #7 and #8 as data symbols directed to the subject station. In other words, as shown in FIG. 8, demapping section 207 extracts four Dchs allocated to RBG1 formed with RBs #1 and #2, and RBG5 formed with RBs #9 and #10 covering all RBs as data symbols directed to the subject station.

Here, in FIG. 8, as in the case of mapping method 1 (FIG. 5), Dch data symbols are allocated to four RBs and Lch data symbols are allocated to 10 RBs. However, according to the present mapping method as shown in FIG. 8, Dch data symbols are allocated in a distributed manner to RB #1, RB #2, RB #9 and RB #10, and therefore the interval thereof is longer by the RB interval where no Dch is mapped (2-RB interval of RBs #7 and #8) than by mapping method 1 (FIG. 5). Therefore, the present mapping method can improve the frequency diversity effect.

By this means, the present mapping method maps one Dch at a maximum interval (8-RB interval four times the RB group size in FIG. 7) among possible intervals of integer multiples of the RB group size. By this means, Lchs can be allocated in RB group units while maximizing the RB interval of one Dch without producing any RB that cannot be used. Therefore, according to the present mapping method, it is possible to obtain effects similar to those of mapping method 1 and improve the frequency diversity effect compared to mapping method 1.

Although a case has been described in the present mapping method where one RB is divided into two portions when Dchs are used, the number of divisions of one RB is not limited to two, but the number of divisions of one RB may be three or more as in the case of mapping method 1.
Mapping Method 3 (FIG. 9)

The present mapping method is the same as mapping method 1 in that one Dch is mapped at intervals of an integer multiple of the RB group size among a plurality of RBs, but the present mapping method differs from mapping method 1 in that a plurality of Dchs with continuous channel numbers are mapped to one RB.

Hereinafter, the present mapping method will be described more specifically. Here, one Dch is mapped to two RBs which are mapped in a distributed manner at intervals of 6 RBs as with mapping method 1 (FIG. 4).

Figure 9:
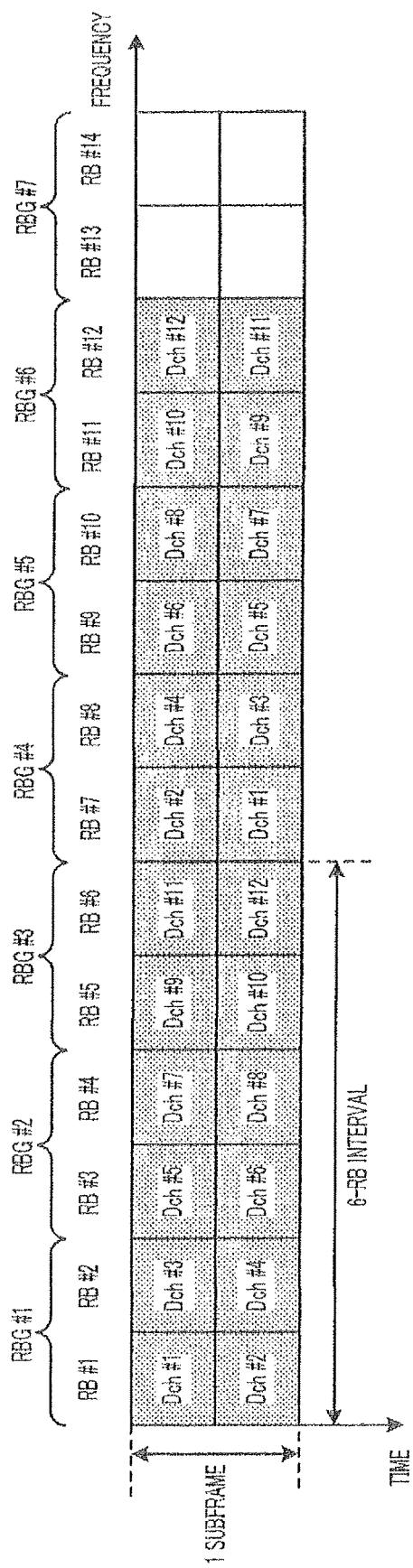
FIG. 9 illustrates a Dch mapping method according to mapping method 3 of an embodiment (when using mapping method 1)

As shown in FIG. 9, Dchs #1 and #2 with continuous channel numbers are mapped to RB #1 (RB #7). Likewise, Dchs #3 and #4 are mapped to RB #2 (RB #8), Dchs #5 and #6 are mapped to RB #3 (RB #9), Dchs #7 and #8 are mapped to RB #4 (RB #10), Dchs #9 and #10 are mapped to RB #5 (RB #11) and Dchs #11 and #12 are mapped to RB #6 (RB #12).

Thus, since one Dch is mapped to two RBs at intervals of 6 RBs, when allocating Lchs to the rest of the RBs after allocating Dchs as with mapping method 1, it is possible to allocate Lchs in RB group units without producing any RBs that cannot be used. Furthermore, since a plurality of Dchs with continuous channel numbers are mapped to one RB, when one mobile station uses a plurality of Dchs, all the one RB subblocks are used first and then the other RBs are used. Therefore, data symbols are allocated to some subblocks of a plurality of subblocks constituting one RB, and on the other hand, it is possible to minimize the possibility that other subblocks may not be further used. This makes it possible to improve the utilization efficiency of Dch resources.

Furthermore, as with mapping method 1, allocation section 103 of base station 100 (FIG. 1) and demapping section 207 of mobile station 200 (FIG. 2) store the Dch mapping pattern shown in FIG. 9, which is the correspondence between RBs and Dchs, in advance. Allocation section 103 of base station 100 then allocates Dch data symbols to RBs according to the Dch mapping pattern shown in FIG. 9. On the other hand, demapping section 207 of mobile station 200 extracts Dch data symbols directed to the subject station from a plurality of RBs according to the Dch mapping pattern shown in FIG. 9 as with allocation section 103.

By this means, the present mapping method maps a plurality of Dchs with continuous channel numbers in one RB, and thereby increases the probability that data symbols may be allocated to all RB subblocks used for Dchs. Therefore, it is possible to prevent deterioration of system throughput due to deterioration of the utilization efficiency of communication resources compared to mapping method 1.

Figure 10:
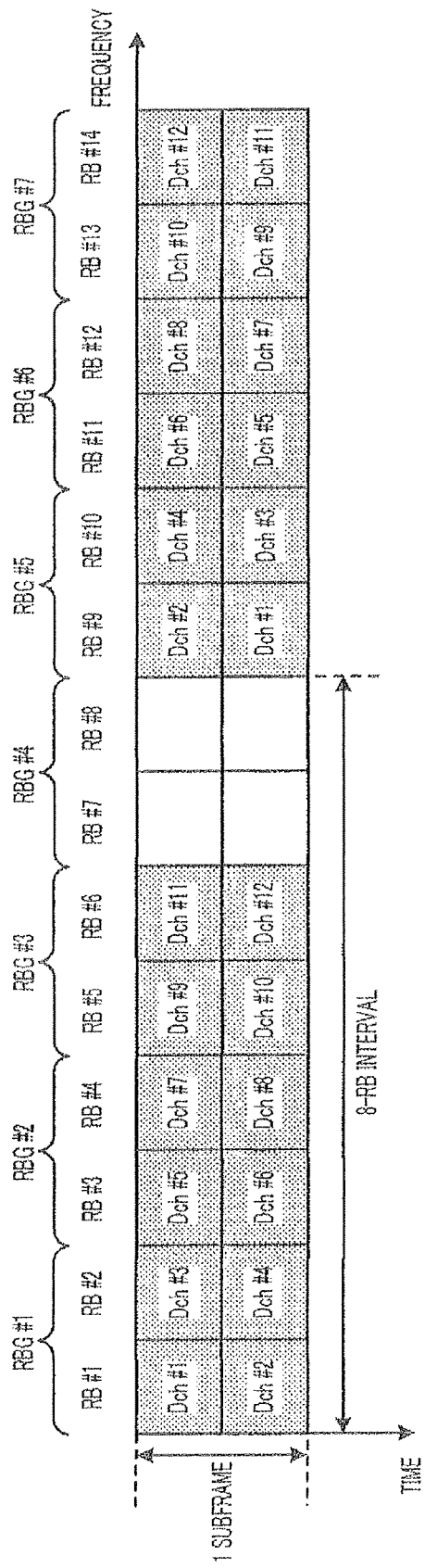
FIG. 10 illustrates a Dch mapping method according to mapping method 3 of an embodiment (when using mapping method 2)

As with mapping method 2 (FIG. 7), the present mapping method may map one Dch at the maximum interval among possible intervals of integer multiples of the RB group size. To be more specific, as shown in FIG. 10, one Dch may be mapped to RBs mapped in a distributed manner at intervals of 8 RBs. This makes it possible to achieve a diversity effect similar to that of mapping method 2 while achieving effects similar to those of the present mapping method.
Mapping Method 4 (FIG. 11)

The present mapping method is the same as mapping method 1 in that one Dch is mapped at intervals of an integer multiple of the RB group size of a plurality of RBs, but the present mapping method is different from mapping method 1 in that a plurality of Dchs with continuous channel numbers are mapped to different RBs constituting one RB group.

Hereinafter, the present mapping method will be described more specifically. Here, as with mapping method 1 (FIG. 4), one Dch is mapped to two RBs mapped in a distributed manner at intervals of 6 RBs.

Figure 11:
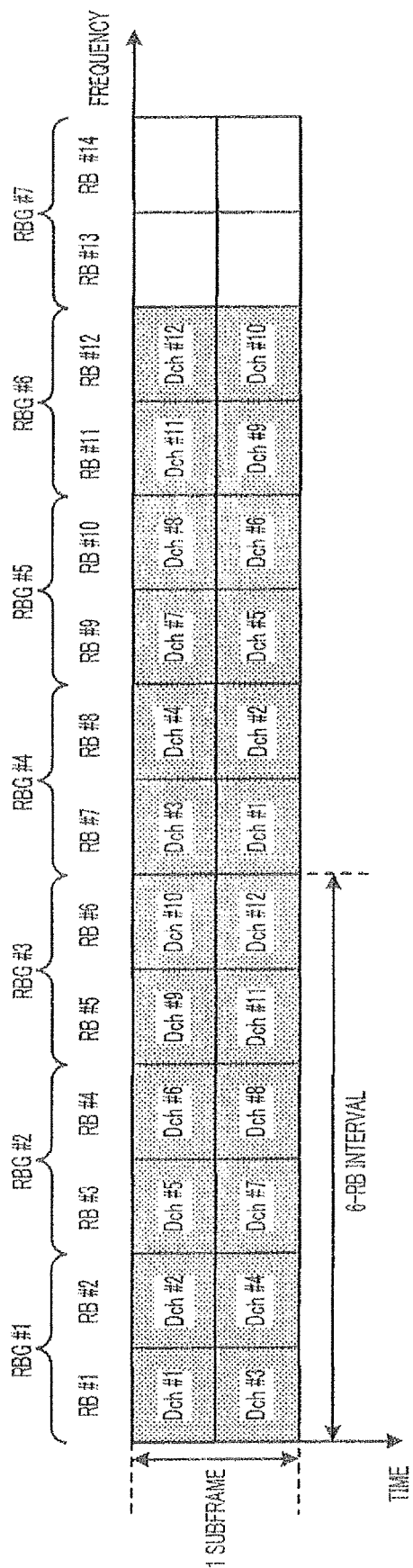
FIG. 11 illustrates a Dch mapping method according to mapping method 4 of an embodiment (when using mapping method 1)

As shown in FIG. 11, Dchs #1 and #3 are mapped to RB #1 (RB #7), Dchs #2 and #4 are mapped to RB #2 (RB #8), Dchs #5 and #7 are mapped to RB #3 (RB #9), Dchs #6 and #8 are mapped to RB #4 (RB #10), Dchs #9 and #11 are mapped to RB #5 (RB #11) and Dchs #10 and #12 are mapped to RB #6 (RB #12).

That is, as shown in FIG. 11, Dchs #1 to #4 with continuous channel numbers are mapped to RBs #1 and #2 (RBs #7 and #8) constituting RBG1 (RBG4). Furthermore, in RBG1 (RBG4), Dch #1 (Dch #3) and Dch #2 (Dch #4) with continuous channel numbers among Dchs #1 to #4 are mapped to different RBs of RB #1 and #2 respectively. Furthermore, as shown in FIG. 11, Dch #3 and Dch #2 with continuous channel numbers are also mapped to different RBs of RBs #1 and #2 respectively. The same applies to RBG2 (RBG5) and RBG3 (RBG6).

Thus, since a plurality of Dchs with continuous channel numbers are mapped to one RB group, even when one mobile station uses a plurality of Dchs, RBs are used in RB group units for Dchs. Therefore, when RBs other than the RBs used for Dchs are allocated to Lchs, RBs can also be used in RB group units for Lchs. That is, since RBs can be used exhaustively, it is possible to prevent deterioration in the utilization efficiency of communication resources more than mapping method 1. Furthermore, in the RB group, Dchs with continuous channel numbers are mapped to different RBs, and therefore the diversity effect can be improved.

Furthermore, as with mapping method 1, allocation section 103 of base station 100 (FIG. 1) and demapping section 207 of mobile station 200 (FIG. 2) store the Dch mapping pattern shown in FIG. 11, which is the correspondence between RBs and Dchs, in advance. Allocation section 103 of base station 100 then allocates Dch data symbols to RB s according to the Dch mapping pattern shown in FIG. 11. On the other hand, as with allocation section 103, demapping section 207 of mobile station 200 extracts Dch data symbols directed to the subject station from a plurality of RBs according to the Dch mapping pattern shown in FIG. 11.

By this means, the present mapping method maps a plurality of Dchs with continuous channel numbers in different RBs constituting one RB group respectively. By this means, even when a plurality of Dchs are used, the plurality of Dchs are collectively allocated in RB group units. That is, even when one mobile station uses a plurality of Dchs, Dchs are allocated to RB units, and therefore Lchs can also be allocated in RB group units. Thus, the present mapping method can prevent deterioration of system throughput due to deterioration of the utilization efficiency of communication resources compared to mapping method 1. Furthermore, since different Dchs with continuous channel numbers are allocated to different RB s within one RB group, the frequency diversity effect can be further improved.

Figure 12:
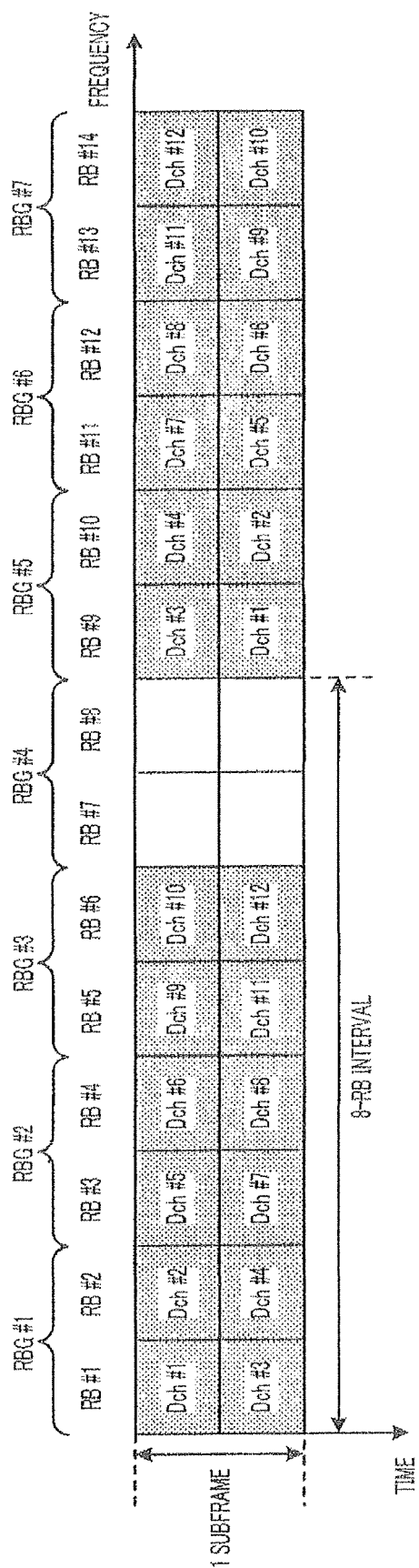
FIG. 12 illustrates a Dch mapping method according to mapping method 4 of an embodiment (when using mapping method 2)

As with mapping method 2 (FIG. 7), the present mapping method may also map one Dch at the maximum interval among possible intervals of integer multiples of the RB group size. To be more specific, as shown in FIG. 12, one Dch may be mapped to RBs mapped in a distributed manner at intervals of 8 RBs. This makes it possible to achieve a diversity effect similar to that of mapping method 2 while achieving effects similar to those of the present mapping method.

Figure 13:
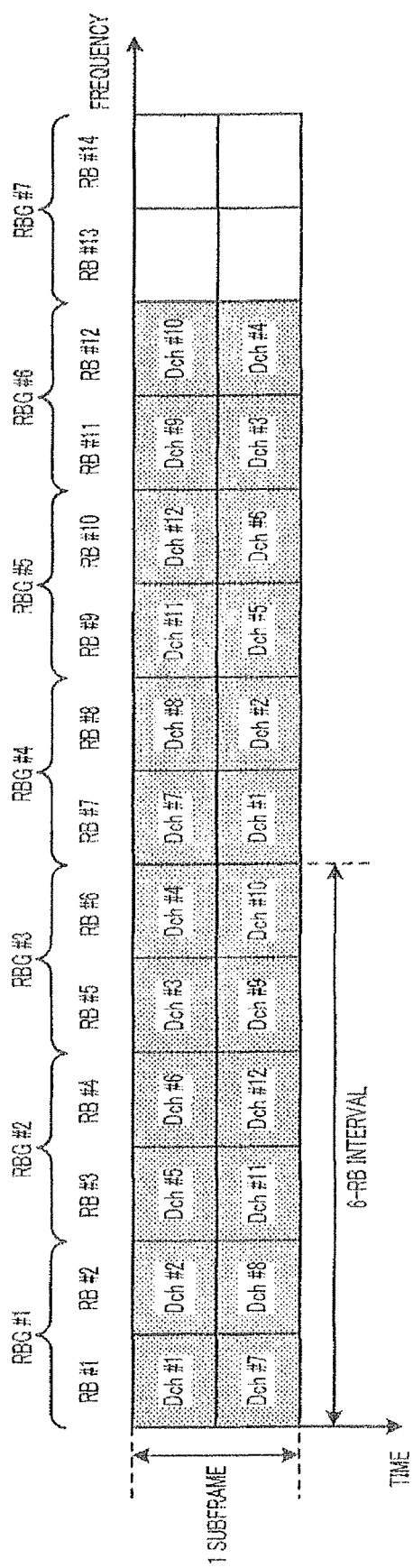
FIG. 13 illustrates a Dch mapping method according to mapping method 5 of an embodiment (when using mapping method 1)

Mapping Method 5 (FIG. 13)

The present mapping method is the same as mapping method 4 in that a plurality of Dchs with continuous channel numbers are mapped to different RBs constituting one RB group, but the present mapping method is different from mapping method 4 in that a plurality of Dchs with discontinuous channel numbers are mapped to mutually neighboring RBs among a plurality of RBs constituting mutually neighboring RB groups.

Hereinafter, the present mapping method will be described more specifically. Here, as with mapping method 1 (FIG. 4), one Dch is mapped to two RBs mapped in a distributed manner at intervals of 6 RBs.

As shown in FIG. 13, Dchs #1 and #7 are mapped to RB #1 (RB #7), Dchs #2 and #8 are mapped to RB #2 (RB #8), Dchs #5 and #11 are mapped to RB #3 (RB #9), Dchs #6 and #12 are mapped to RB #4 (RB #10), Dchs #3 and #9 are mapped to RB #5 (RB #11), and Dchs #4 and #10 are mapped to RB #6 (RB #12).

That is, as shown in FIG. 13, Dchs #1 and #2 (Dchs #7 and #8) with continuous channel numbers are mapped to RBs #1 and #2 constituting RBG1. Likewise, Dchs #5 and #6 (Dchs #11 and #12) with continuous channel numbers are mapped to RBs #3 and #4 constituting RBG2, and Dchs #3 and #4 (Dchs #9 and #10) with continuous channel numbers are mapped to RBs #5 and #6 constituting RBG3.

Furthermore, a plurality of different Dchs with discontinuous channel numbers are mapped to RB #2 and RB #3, which are mutually neighboring RBs (that is, RBs on the boundary between RBG1 and RBG2) of RBs constituting mutually neighboring RBG1 (RBs #1 and #2) and RBG2 (RBs #3 and #4). To be more specific, as shown in FIG. 13, Dch #2 and Dch #5 (Dch #8 and Dch #11) with discontinuous channel numbers are mapped to RB #2 and RB #3 respectively. Likewise, Dch #6 and Dch #3 (Dch #12 and Dch #9) with discontinuous channel numbers are mapped to mutually neighboring RB #4 and RB #5 among RB #3 and #4 constituting RBG2, and RB #5 and #6 constituting RBG3. The same applies to RBG4 to RBG6.

By this means, at least one set of Dchs with continuous channel numbers is mapped to one RB group. Furthermore, channel numbers of Dchs mapped to mutually neighboring RBs among a plurality of RBs constituting mutually neighboring RB groups respectively are discontinuous. In other words, Dchs with continuous channel numbers among Dchs mapped to different RB groups are mapped to RBs distributed in the frequency domain.

Thus, when one mobile station uses many Dchs, allocation section 103 allocates Dchs to RBs distributed in the frequency domain, and thereby provide frequency diversity effect. On the other hand, when one mobile station uses a fewer Dchs, allocation section 103 can collectively allocate Dchs within an RB group. By this means, when RBs other than the RBs used for Dchs are allocated to Lchs, RBs can also be used in RB group units for Lchs. That is, RBs can be used exhaustively, and it is therefore possible to prevent deterioration of the utilization efficiency of communication resources.

Furthermore, as with mapping method 1, allocation section 103 of base station 100 (FIG. 1) and demapping section 207 of mobile station 200 (FIG. 2) store the Dch mapping pattern shown in FIG. 13, which is the correspondence between RBs and Dchs, in advance. Allocation section 103 of base station 100 then allocates Dch data symbols to RBs according to the Dch mapping pattern shown in FIG. 13. On the other hand, as with allocation section 103, demapping section 207 of mobile station 200 extracts Dch data symbols directed to the subject station from a plurality of RBs according to the Dch mapping pattern shown in FIG. 13.

By this means, the present mapping method maps a plurality of Dchs with discontinuous channel numbers in mutually neighboring RBs among a plurality of RBs constituting mutually neighboring RB groups. Thus, as with mapping method 1, it is possible to prevent deterioration of system throughput due to deterioration in the utilization efficiency of communication resources when one mobile station uses a fewer Dchs, and improve the frequency diversity effect when one mobile station uses many Dchs.

Figure 14:
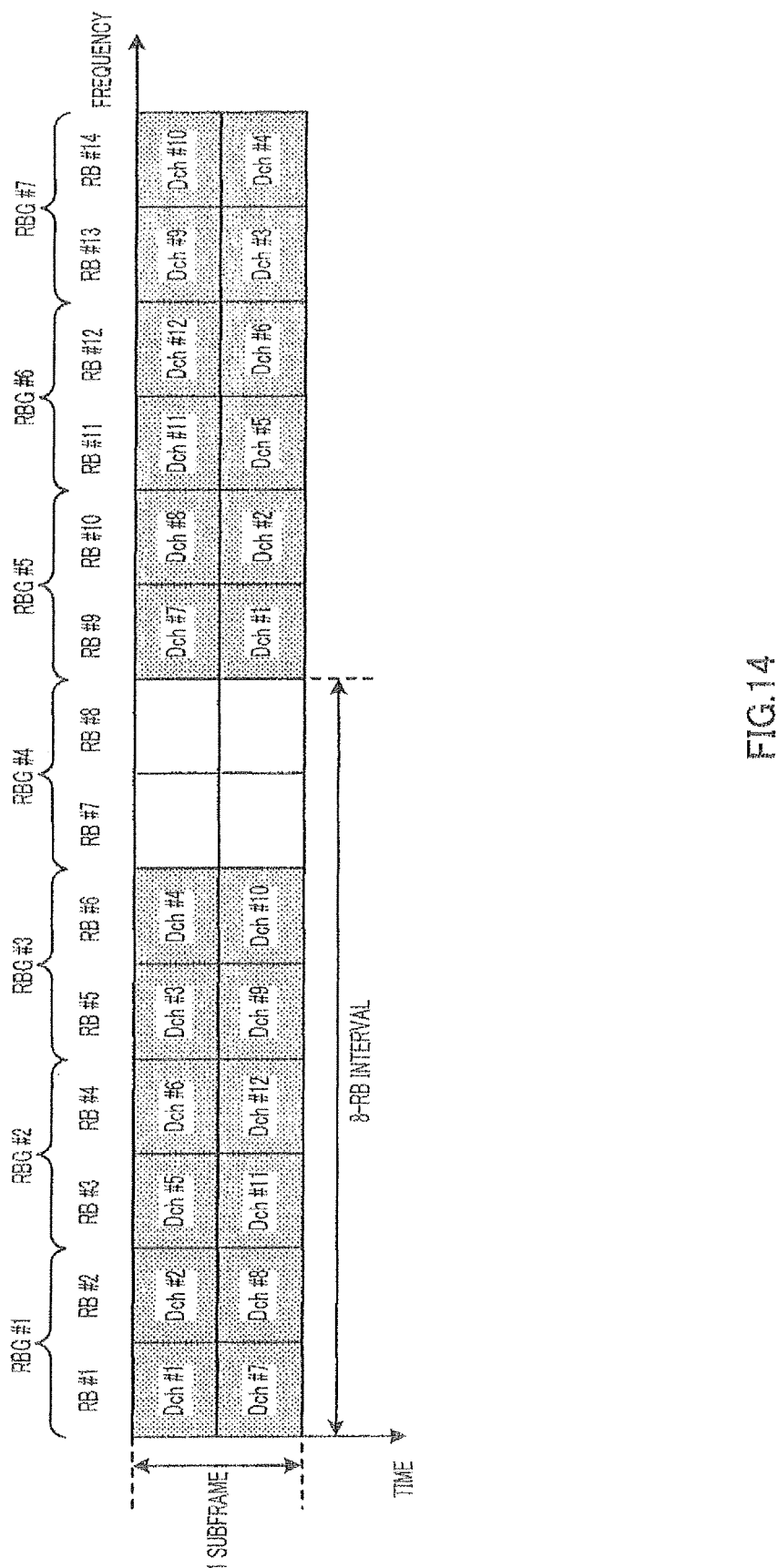
FIG. 14 illustrates a Dch mapping method according to mapping method 5 of an embodiment (when using mapping method 2).

According to the present mapping method, one Dch may be mapped at the maximum interval among possible intervals of integer multiples of the RB group size as with mapping method 2 (FIG. 7). To be more specific, as shown in FIG. 14, one Dch may be mapped to RBs mapped in a distributed manner at intervals of 8 RBs. This makes it possible to achieve a diversity effect similar to that of mapping method 2 while achieving effects similar to those of the present mapping method.

Mapping methods 1 to 5 according to the present embodiment have been described so far.

Thus, according to the present embodiment, it is possible to prevent deterioration in the utilization efficiency of communication resources even when frequency scheduling transmission through Lchs and frequency diversity transmission through Dchs are carried out at the same time.

An embodiment has been described so far.

In the above described embodiment, the channel mapping method for mapping Dchs in RBs depends on the number of all RBs (Nrb) determined by the system bandwidth as shown in equation 1 or equation 3. Therefore, the base station and mobile station may be configured to have a table of correspondence between Dch channel numbers and RB numbers for each system bandwidth (e.g., FIG. 4, FIG. 7, FIG. 9, FIG. 11 and FIG. 13) and look up the table of correspondence corresponding to the system bandwidth to which Dch data symbols are allocated when allocating Dch data symbols.

Furthermore, a case has been described with the above-described embodiment where a signal received by the base station (that is, a signal transmitted by the mobile station over an uplink) is transmitted based on an OFDM scheme, but this signal may also be transmitted based on transmission schemes other than the OFDM scheme such as a single-carrier scheme or CDMA scheme.

Furthermore, a case has been described with the above-described embodiment where an RB is formed with a plurality of subcarriers comprised of an OFDM symbol, but an RB may be any block formed with continuous frequencies.

Furthermore, a case has been described with the above-described embodiment where RBs are continuously configured in the frequency domain, but RBs may also be continuously configured in the time domain.

Furthermore, a case has been described with the above-described embodiment is applied to a signal transmitted by the base station (that is, a signal transmitted by the base station over a downlink), but embodiments may also be applied to a signal received by the base station (that is, a signal transmitted by the mobile station over an uplink). In this case, the base station performs adaptive control such as RB allocation on an uplink signal.

Furthermore, in the above described embodiment, adaptive modulation is performed on Lchs only, but adaptive modulation may also be performed on Dchs likewise. In this case, the base station may perform adaptive modulation on Dch data based on average received quality information of an entire band reported from each mobile station.

Furthermore, a case has been described with the above-described embodiment where RB used for Dch is divided into a plurality of subblocks in the time domain, but RB used for Dch may also be divided into a plurality of subblocks in the frequency domain or may also be divided into a plurality of subblocks in the time domain and frequency domain. That is, a plurality of Dchs may be frequency-domain-multiplexed in one RB or may be time-domain-multiplexed or frequency-domain-multiplexed.

Furthermore, although a case has been described in the present embodiment where when a plurality of different Dchs with continuous channel numbers are allocated to one mobile station, only the first channel number and the last channel number are reported from the base station to the mobile station, the first channel number and the number of channels may be reported from the base station to the mobile station.

Furthermore, although a case has been described in the present embodiment where one Dch is mapped to RBs which are mapped to be distributed uniformly in the frequency domain, RBs to which one Dch is mapped are not limited to RBs mapped to be distributed uniformly in the frequency domain.

Furthermore, although a case has been described with the above-described embodiment where Dchs are used as channels for carrying out frequency diversity transmission, the channels are not limited to Dchs, but the channels may be any channels that are mapped in a distributed manner in a plurality of RBs or a plurality of subcarriers in the frequency domain and can provide frequency diversity effect. Furthermore, although Lchs are used as the channels for carrying out frequency scheduling transmission, the channels used are not limited to Lchs, but the channels may be any channels that can provide multiuser diversity effect.

Furthermore, Dch may also be referred to as "DVRB" (Distributed Virtual Resource Block) and Lch may also be referred to as "LVRB" (Localized Virtual Resource Block). Furthermore, RB used for Dch may also be referred to as "DRB" or "DPRB" (Distributed Physical Resource Block) and RB used for Lch may also be referred to as "LRB" or "LPRB" (Localized Physical Resource Block).

Furthermore, a mobile station may also be referred to as "UE," a base station apparatus may also be referred to as "Node B" and a subcarrier may also be referred to as "tone." Furthermore, an RB may also be referred to as a "subchannel," "subcarrier block," "subcarrier group," "subband" or "chunk." Furthermore, a CP may also be referred to as a "guard interval (GI)". Furthermore, a subframe may also be referred to as a "slot" or "frame." A subblock may also be referred to as a "slot."

Furthermore, a case has been described with the above-described embodiment where an RB is divided into two subblocks in the time domain and Dch is allocated thereto, and each divided subblock may be referred to as "RB." In this case, encoding and adaptive control or the like are performed in two RBs in the time domain.

Moreover, although cases have been described with the embodiment above configured by hardware, embodiments may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-000198, filed on Jan. 4, 2008 and Japanese Patent Application No. 2008-062970, filed on Mar. 12, 2008, including the specification, drawings and abstract, is incorporated herein by reference in its entirety.

INDUSTRIAL APPLICABILITY

The present disclosure is applicable to a mobile communication system or the like.

The invention claimed is:

1. An integrated circuit for controlling operation of a device, the integrated circuit comprising,
    circuitry, which, in operation:
    controls reception of assignment information indicating resource blocks, each of which being formed of consecutive subcarriers in a frequency domain, allocated to the device according to one of a plurality of resource allocations including:
        a resource allocation allocating Distributed Virtual Resource Blocks (DVRBs), where a pair of DVRBs assigned with a single resource block number are mapped to Physical Resource Blocks (PRBs) with a variable gap in the frequency domain, the variable gap is an integer multiple of a Resource Block Group (RBG) size defined as a number of one or more consecutive resource blocks forming one RBG in a given system bandwidth; and
        a resource allocation allocating one or more RBGs; and
    decodes data based on the assignment information.

2. The integrated circuit according to claim 1, comprising:
    at least one input coupled to the circuitry, wherein the at least one input, in operation, inputs data; and
    at least one output coupled to the circuitry, wherein the at least one output, in operation, outputs data.

3. The integrated circuit according to claim 1 wherein the given system bandwidth is configured out of a plurality of system bandwidths, and the variable gap and the RBG size are determined from the given system bandwidth.

4. The integrated circuit according to claim 1 wherein the RBG size is greater than one.

5. The integrated circuit according to claim 1 wherein the pair of DVRBs assigned with the single resource block number are mapped to PRBs that are different in a time domain.

6. The integrated circuit according to claim 1 wherein Localized Virtual Resource Blocks (LVRBs), which are mapped to PRBs, are allocated to the device by units of RBGs.

7. The integrated circuit according to claim 1 wherein the variable gap is a largest gap which is an integer multiple of the RBG size and which is equal to or less than Nrb/Nd, where Nrb is the given system bandwidth expressed as a total number of resource blocks, and Nd is a total number of DVRBs mapped to PRBs in the same frequency in a subframe.

8. The integrated circuit according to claim 1 wherein the variable gap is a largest gap which is an integer multiple of the RBG size and which is available based on the given system bandwidth.

9. The integrated circuit according to claim 1 wherein the variable gap has a direct relationship with both the given system bandwidth and the RBG size.

10. The integrated circuit according to claim 1 wherein the variable gap is obtained from the given system bandwidth and the RBG size.

11. The integrated circuit according to claim 1 wherein the assignment information is based on a starting resource block number and a number of the allocated DVRBs with consecutive resource block numbers.

12. The integrated circuit according to claim 1 wherein the assignment information includes a bitmap indicating the allocated RBGs.

13. An integrated circuit to control a process of a device, the process controlled by the integrated circuit comprising,
receiving of assignment information indicating resource blocks, each of which being formed of consecutive subcarriers in a frequency domain, allocated to the device according to one of a plurality of resource allocations including:
a resource allocation allocating Distributed Virtual Resource Blocks (DVRBs), where a pair of DVRBs assigned with a single resource block number are mapped to Physical Resource Blocks (PRBs) with a variable gap in the frequency domain, the variable gap is an integer multiple of a Resource Block Group (RBG) size defined as a number of one or more consecutive resource blocks forming one RBG in a given system bandwidth; and
a resource allocation allocating one or more RBGs; and
decoding of data based on the assignment information.

14. The integrated circuit according to claim 13, comprising:
circuitry, which, in operation, controls the process;
at least one input coupled to the circuitry, wherein the at least one input, in operation, inputs data; and
at least one output coupled to the circuitry, wherein the at least one output, in operation, outputs data.

15. The integrated circuit according to claim 13 wherein the given system bandwidth is configured out of a plurality of system bandwidths, and the variable gap and the RBG size are determined from the given system bandwidth.

16. The integrated circuit according to claim 13 wherein the RBG size is greater than one.

17. The integrated circuit according to claim 13 wherein the pair of DVRBs assigned with the single resource block number are mapped to PRBs that are different in a time domain.

18. The integrated circuit according to claim 13 wherein Localized Virtual Resource Blocks (LVRBs), which are mapped to PRBs, are allocated to the device by units of RBGs.

19. The integrated circuit according to claim 13 wherein the variable gap is a largest gap which is an integer multiple of the RBG size and which is equal to or less than Nrb/Nd, where Nrb is the given system bandwidth expressed as a total number of resource blocks, and Nd is a total number of DVRBs mapped to PRBs in the same frequency in a subframe.

20. The integrated circuit according to claim 13 wherein the variable gap is a largest gap which is an integer multiple of the RBG size and which is available based on the given system bandwidth.

* * * * *